Sept. 23, 1924. 1,509,468
W. P. M. BRAUN
GANG LAWN CLEANER AND RAKE
Filed March 29, 1922 3 Sheets-Sheet 1

WITNESS:

INVENTOR
William P. M. Braun
BY
ATTORNEY.

Sept. 23, 1924.  
W. P. M. BRAUN  
GANG LAWN CLEANER AND RAKE  
Filed March 29, 1922  
1,509,468  
3 Sheets-Sheet 2

WITNESS:  
Rob't R. Mitchel

INVENTOR  
William P. M. Braun  
BY  
Augustus B. Stoughton  
ATTORNEY.

Patented Sept. 23, 1924.

1,509,468

UNITED STATES PATENT OFFICE.

WILLIAM P. M. BRAUN, OF PHILADELPHIA, PENNSYLVANIA.

GANG LAWN CLEANER AND RAKE.

Application filed March 29, 1922. Serial No. 547,676.

*To all whom it may concern:*

Be it known that I, WILLIAM P. M. BRAUN, a citizen of the United States, residing at Philadelphia, in the county of Philadelphia and State of Pennsylvania, have invented a new and useful Improvement in Gang Lawn Cleaners and Rakes, of which the following is a specification.

The principal objects of the present invention are to provide a frame and lawn cleaner and rake units combined for operation by a single force and contrived to act as one yet capable of individual control and of proper relative movements; to provide for lifting the ground roller of each unit and also the driving wheels of each unit if desired; to contrive the various parts in such a way that the units while capable of collective operation with the frame are useful singly for manual operation; to combine a self-sustaining frame and self-sustaining units in such a way that the frame and units are capable of proper relative rocking motion while at the same time the units are drawn along by the frame; to adapt the construction of the units in such a way as to make them self-sustaining; and to provide a satisfactory and efficient gang lawn cleaner and rake.

Other objects of the invention will appear from the following description, and the invention will be claimed at the end hereof but will be first described in connection with the embodiment of it chosen from other embodiments for the sake of illustration in the accompanying drawings forming part hereof and in which—

Figure 1:
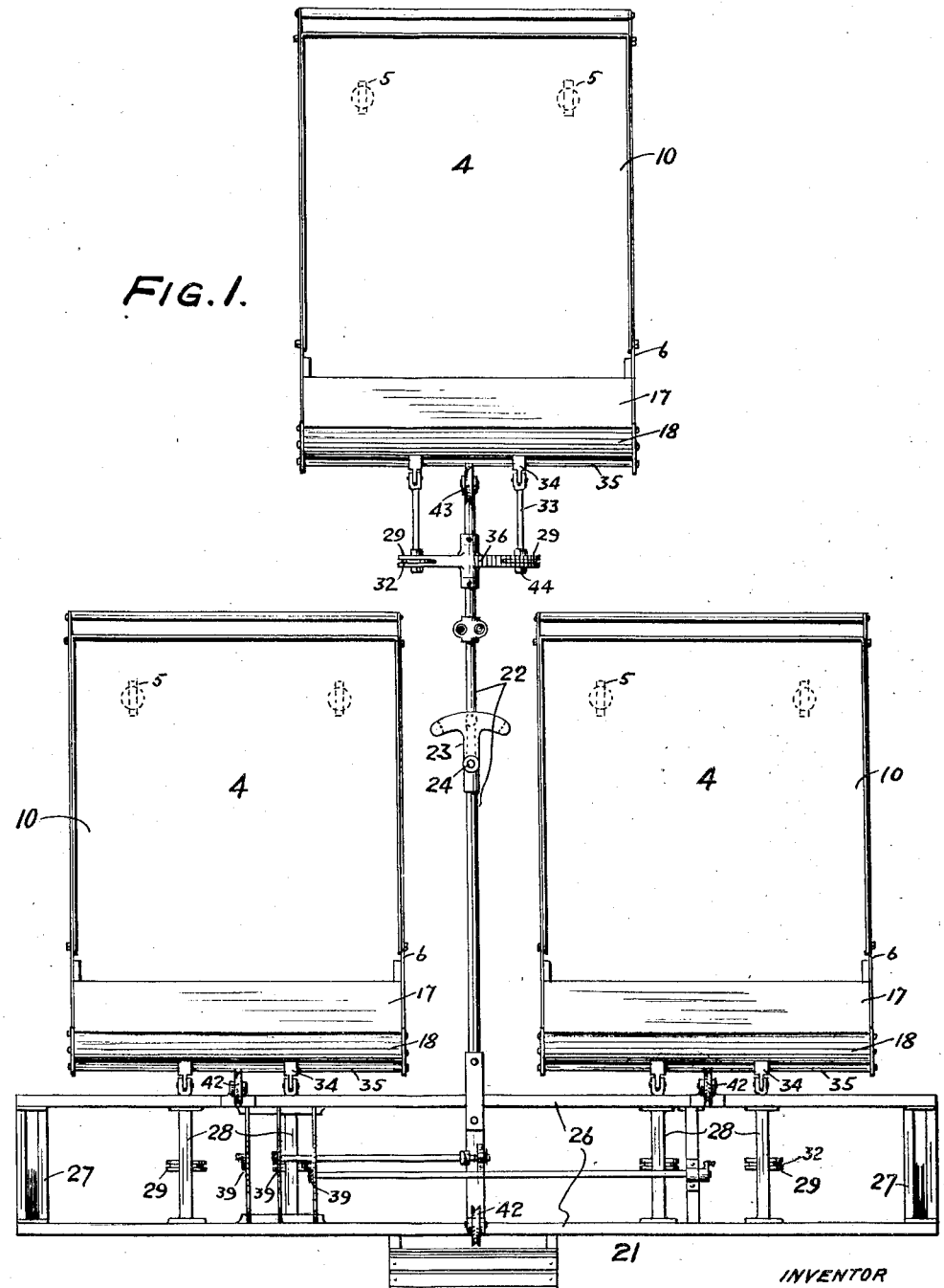
Figure 1 is a top or plan view with some of the superstructure omitted of a gang lawn cleaner and rake embodying features of the invention.
Figure 2:
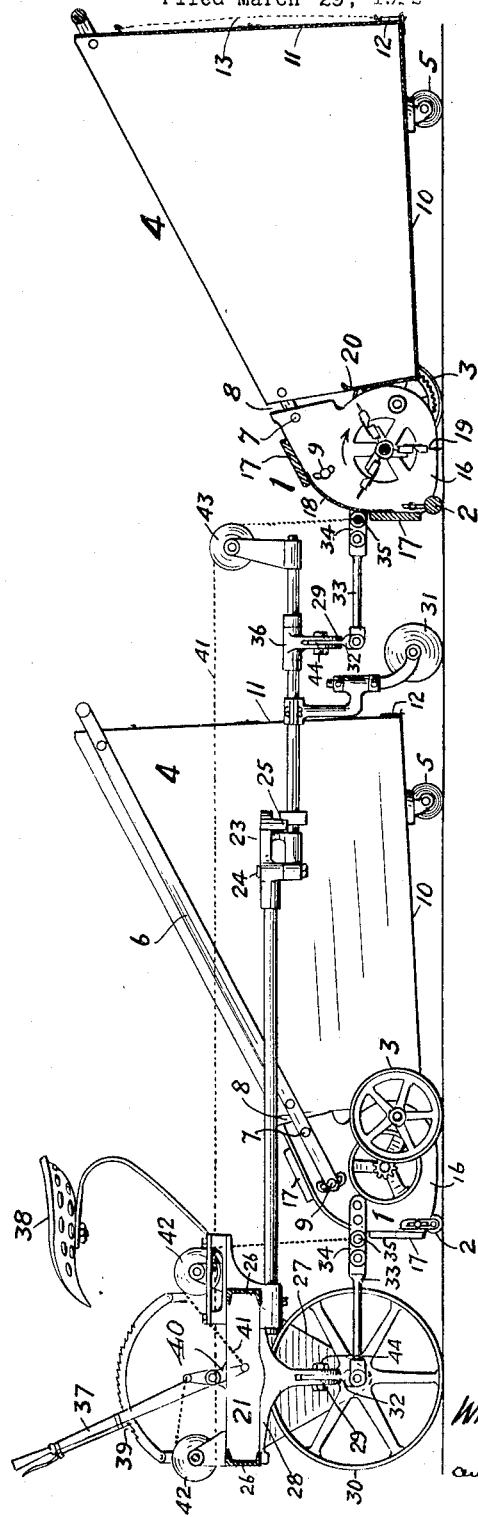
Fig. 2 is a side view, partly in section, of a gang lawn cleaner or rake embodying features of the invention.
Figure 6:
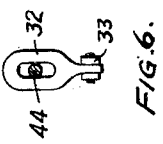
Fig. 6 is a view illustrating a detail of construction.
Figure 3:
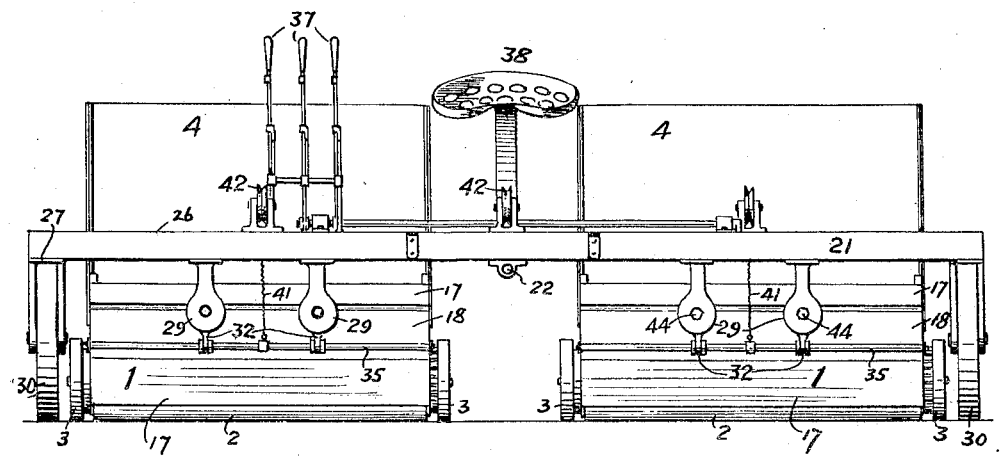
Fig. 3 is a front view of the same.
Figure 4:
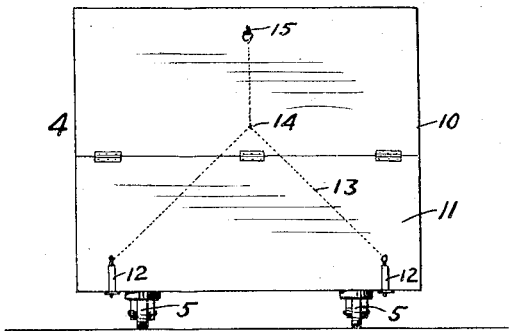
Fig. 4 is a rear view of one of the units.
Figure 5:
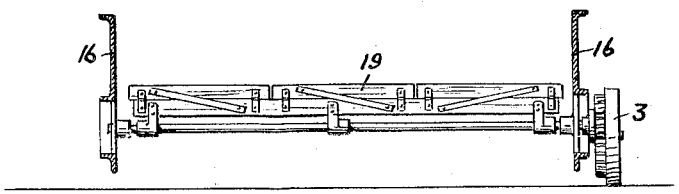
Fig. 5 is a front view drawn to an enlarged scale and illustrating, partly in section, features of construction of one of the units.

The cleaner and rake units are duplicates of each other and a descritpion of one will therefore be sufficient. 1, generally, is a sweeper section having a roller 2 and driving wheels 3; and 4, generally, is a carrying section having ground wheels 5 shown as casters, and these sections 1 and 4 are articulated or hinged for a limited range of relative movement. As shown the hinge or articulation is provided by a handle structure 6 fast on the carrying section 4 and pivoted to the sweeper section 1 at 7, and the range of relative movement is provided by the stop or abutment surfaces at 8 between the sections 1 and 4. In addition to the pivotal connection 7 between the section 1 and the handle structure 6, there is a slot-and-pin connection 9, so that the unit can be operated manually and is self-sustaining in the sense that it can run on the driving wheels 3 and ground wheels or casters 5, and when used manually and pushed by means of the handle structure 6 the ground wheels or casters 5 can be lifted clear of the ground and the unit carried by the driving wheels 3, or, if desired, by bearing down on the handle structure 6 the unit can be run on the ground wheels 5 with the driving wheels 3 clear of the ground. Generally speaking, the carrying section includes a hopper or receptacle 10 having at the lower portion of its rear wall a door or gate 11 hinged at the top for outward opening and controlled by spring catches 12 having a chain 13 accessible from the top and which can be pulled conveniently to release the catches and lift the gate or door 11, and when the door is open the branch at 14 in the chain can be hooked onto the pin 15 in order to hold the door or gate in open position. Upon release of the chain the door or gate falls into closed position in which it is secured by the spring catches 12. The sweeper sections comprise end plates 16 connected by cross pieces 17 carrying a hood 18. The roller 2 and revolving rake or brush 19 are carried between these end pieces 16 and the latter also carry the driving wheels 3 which are geared to the rake or brush 19. The rotating element 19 is well understood both in construction and operation and it is rotated in the direction indicated by the arrow in Fig. 2 and serves to sweep or rake leaves and the like from the ground and throw them through the hood 18 and over the guard or wall 20 into the receptacle 10. The frame comprises an interconnected bolster, generally indicated at 21, and a reach, generally indicated at 22. The reach is equipped with a fifth wheel mechanism 23 of limited range and including a pivot 24 and spaced stops 25. As shown the bolster consists of side pieces 26 and end pieces 27 and of cross pieces of which those indicated at 28 are provided with downwardly extending brackets 29, shown as forked. 30 are carrying wheels upon which the end pieces of the frame are mounted, and 31 is a caster upon which the reach 22 is mounted so that the frame is self-supporting in the sense that it can travel on the wheels 30 and 31. Slotted fittings 32 are arranged in the forks of the brackets 29 and the bolts 44 serve to detachably connect the parts and to afford them a range of relatively sliding motion. 33 are links, draw bars or radius rods arranged in spaced relation and pivoted or, more accurately, hinged to two of the fittings 32 and to clips 34 mounted on rods 35 arranged at the front of the sweeper sections and connected to the end plates 16 thereof. The reach 22 is provided with a yoke 36 carrying depending brackets 29 to which the rear unit is connected by the means and in the manner just described. The yoke 36 is turnably mounted on the reach 22 and it is shown as arranged between a pair of collars fastened to the reach. Lifting gear is provided between the frame and each sweeper section for tilting the latter on its driving wheels 3 to lift the roller 2 and for tilting the sweeper and carrying sections on the ground wheels or casters 5 to clear both the driving wheels 3 and the roller 2. This lifting gear comprises a hand lever 37, accessible from the driver's seat 38, mounted toward the rear of the frame, and co-operating with a quadrant latch mechanism 39, there being one lever for each unit. Connected with the lever 37 is a crank arm 40, and the crank arm 40 is connected by a chain 41 running over a pulley 42 with the rod 35 at the front of each unit. In the case of the rear unit the chain 41 extends over a pulley 43 mounted on the reach, whereas the pulleys 42 are mounted on the frame 21.

In use since the frame is self-supporting on its own wheels it can travel over the ground and remain at rest without any tilting or tipping action because its wheels are properly spaced for the accomplishment of that result and, as shown the wheels are spaced to provide a three-point support for the frame which is a very stable construction. Each unit is also, by the provision of the ground wheels or casters 5, self-supporting in the sense that it is stable and can travel over the ground with such rocking motion as the ground may induce. The described radius rod connection between the frame and the individual units permits of freedom of individual rising and falling motion and yet keeps the units and frame in alignment while trailing the units in a manner that causes them to function properly. The fittings 32 by rising and falling in the brackets 29 with which they are connected by slot and bolt connection, accommodate rocking motion of the individual units as does also the movable yoke 36. The operator, by shifting the appropriate handle 37, can accomplish two things. He can lift the roller 2 of any one or all of the units and he can lift the driving wheels 3 and roller 2 of any one or all of the units, and, as has been indicated, the carrying sections 4 can be conveniently emptied by operating the chains 13. The depending brackets 29 and fittings 32 not only provide for endwise rising and falling, or rocking, motion of the units, but also since they can be readily disconnected by means of the bolts 44, they form a convenient detachment for the units. The brackets 29 are also well adapted for connecting lawn mower units, thus making the frame suitable for both mowing and cleaning lawns; in fact the units can be changed by the simple operation of bolting and unbolting them, it being understood that fittings like 29 are a part of the equipment of the lawn mower units.

In this description and in the claims the term "cleaner and rake units" includes the element whether fitted with a revolving brush or a revolving rake.

It will be obvious to those skilled in the art to which the invention relates that modifications may be made in details of construction and arrangement without departing from the spirit of the invention which is not limited to such matters or otherwise than as the prior art and the appended claims may require.

I claim:

1. A gang lawn cleaner and rake comprising in combination a set of self-supporting sectional cleaner and rake units each comprising a sweeper section having a roller and driving wheels and a carrying section having ground wheels and said sections articulated for a limited range of relative movement, a self-supporting frame comprising an interconnected wheeled bolster and a wheeled reach having a fifth wheel, radius rod and slot-and-pin connections between the frame and each unit for trailing the latter with freedom for rocking and vertical movements in respect to the frame, and lifting gear between the frame and each sweeper section for tilting the latter on its driving wheels to lift the roller and for thereafter tilting both sections in respect to the ground wheels to clear the driving wheels.

2. In a gang lawn cleaner and rake the combination of a self-supporting wheeled frame, sweeper and carrying sections having a hinge and a limit stop interposed between them and whereof the first is provided with a roller and driving wheels and whereof the other is provided with carrying wheels, draft means interposed between the sweeper sections and frame, and lifting gear interposed between the frame and sweeper sections to lift the same into two positions one within the limit of the stop and the other beyond the limit of the stop.

3. In a gang lawn cleaner and rake the combination of a wheeled frame, sweeper and carrying sections whereof the first is provided with a roller and driving wheels and whereof the other is provided with carrying wheels, a handle structure fast to the carrying section and movably connected with the sweeper section, a limit stop provided between the sections, detachable traction connections between the frame and sweeper sections, and lifting gear between the sweeper sections and frame.

4. A gang lawn cleaner and rake comprising in combination a wheeled frame of which the wheels operate to make the frame self-supporting, wheeled cleaner and rake units, draft connections between the frame and units, and lifting gear between the frame and units.

5. A gang lawn cleaner and rake comprising in combination a wheeled frame having a fifth wheel and of which the wheels operate to make the frame self-supporting, self-supporting wheeled cleaner and rake units, draft connections between the frame and units, and lifting gear for the individual units.

6. A gang lawn cleaner and rake comprising in combination a wheeled frame including a bolster element and a jointed reach, cleaner and rake units having driving and carrying wheels, spaced brackets depending from the bolster and reach, fittings slidable in respect to the brackets, draw-bars hinged to the fittings and to the units, and individual hand levers and lifting gear for the units.

7. A gang lawn cleaner and rake comprising in combination a wheeled frame having depending forked brackets, wheeled cleaner and rake units, fittings detachably and slidably connected with the brackets, and draft links hinged to the fittings and to the units.

8. A gang lawn cleaner and rake comprising in combination a wheeled frame having a reach, a yoke turnably mounted on the reach, a wheeled cleaner and rake unit, and draw bars connected with the unit and yoke.

WILLIAM P. M. BRAUN.